INVENTORS.
Willis A. Stoner
Dean A. Rains

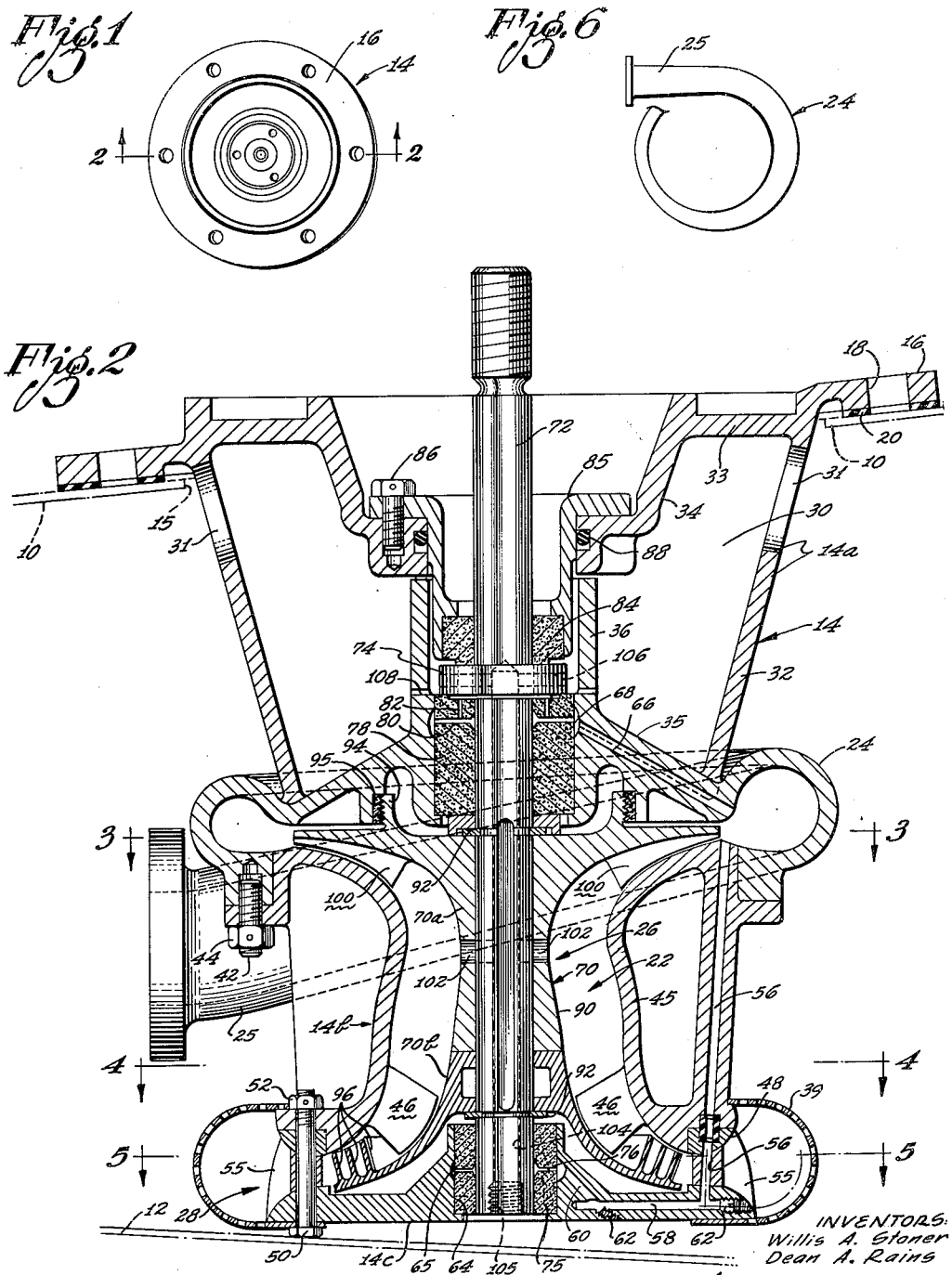

Attorneys,

United States Patent Office 2,985,108
Patented May 23, 1961

2,985,108

VAPOR PURGING PUMP

Willis A. Stoner, Long Beach, and Dean A. Rains, Los Angeles, Calif., assignors, by mesne assignments, to Curtiss-Wright Corporation, a corporation of Delaware Filed Sept. 16, 1957, Ser. No. 684,101

7 Claims. (Cl. 103—113)

This invention relates to a pump for volatile liquids and more particularly is directed to a pump that purges vapor from the liquid in the pump.

The invention has utility in various fields of use where a liquid that is to be pumped is laden with vapor or gas bubbles and where it is desirable to eliminate such bubbles to a substantial degree. There may be various reasons for the elimination of the bubbles. One reason may be to produce a discharge of stable fluid; another reason may be to prevent vapor lock in the pump; a further reason may be to reduce the power required per unit weight of liquid handled by the pump.

The invention is being initially embodied in a booster pump or fuel transfer pump for use on an aircraft. Such a pump will be described herein by way of example for the purpose of disclosure and will provide adequate guidance for those skilled in the art who may have occasion to make other applications of the same principles.

A troublesome problem encountered in the operation of a fuel pump on an aircraft is that when the aircraft climbs rapidly to a high altitude, the resultant reduction of pressure in the fuel tank causes the volatile fuel to boil. A successful transfer pump must, therefore, be capable of functioning satisfactorily in a vigorously cavitating fluid and must have provision for avoiding vapor lock if the fuel boils rapidly enough to fill the pump casing with vapor when the fuel flow is low or nonexistent. This problem is made more difficult by the fact that the weight and space limitations of an aircraft require the use of small high speed fuel transfer pumps.

To meet this problem, the fuel transfer pump of the present invention separates and rejects at least a substantial portion of the fuel vapor so that the pump delivers only stable liquid fuel, the delivered fuel containing only an insignificant amount of vapor in minute bubble form. Purging the liquid fuel of vapor is desirable for the further highly important reason that it eliminates the need for a separate vapor pump and the considerable additional power that is required to pump the separate vapor.

Another problem is to provide a fuel transfer pump that picks up fuel close to the bottom of a fuel tank to enable the pump to empty the tank completely. In this regard, a feature of the present invention is that the transfer pump has a radial inflow port that may be positioned close to the bottom of the fuel tank.

The radial inflow port is the inlet to an annular pump chamber that is part of an annular passage for fluid flow through the pump. The annular pump chamber has a vapor collection zone at a radially inward location, and this vapor collection zone is vented to the exterior of the pump for the continuous release of vapor from the liquid fuel in the pump chamber.

A rotary impeller in the annular pump chamber provides an input or inducer stage at the radial inlet of the chamber and also provides a centrifugal impeller stage at the discharge end of the chamber. Since the inducer stage is at the radial inlet at the bottom of the pump and has blades that force the liquid fuel into the pump in a positive manner, the inducer stage operates effectively when the fuel level in the tank is very low and even when the pump casing is full of vapor.

An important feature of the invention is that the vapor collection zone in the pump chamber is stationary under all operating conditions. The stationary location of this zone enables the pump to operate efficiently at different flow rates and is important in simplifying the venting of the zone to the exterior of the pump.

The unchanging location of the vapor collection zone may be appreciated by considering the operation of a conventional centrifugal pump in which the location of the zone of vapor separation shifts with changes in the relative effectiveness of two opposing forces. One force is the centripetal force or the tendency of the centrifugal field to drive the vapor bubbles radially inward. The opposing force is the tendency of the radially outwardly flowing liquid to drag the vapor bubbles out of the pump chamber. Increase in the drag force relative to the centripetal force at high rates of flow shifts the vapor collection zone toward the discharge end of the pump chamber, and conversely, decrease in the drag force relative to the centripetal force at low rates of flow shifts the vapor collection zone back towards the chamber inlet. At extremely low rates of flow, the vapor collection zone may be so close to the pump chamber that it becomes necessary to provide a vapor pump to return the vapor to the fuel tank.

With the radial inflow inducer of the rotary impeller of the present invention operating at the bottom radial inlet, the tendency of the inflowing liquid to drag the vapor bubbles radially inward combines with the centripetal force on the bubbles to keep the bubbles moving inwardly. Consequently the vapor collection zone is always at an intermediate region of the annular pump chamber and remains at this region throughout the range of flow rates.

Another feature of the invention is the provision of a pressure differential between the vapor collection zone and the exterior of the pump to cause continuous discharge of vapor from the vapor collection zone. This pressure differential is provided by expanding the cross-sectional area of the pump chamber in the region of the vapor collection zone to convert dynamic pressure into static pressure to such a degree that the static pressure is higher than the pressure of the ambient atmosphere outside the pump.

The various features and advantages of the invention may be understood from the following detailed description considered with the accompanying drawings.

In the drawings, which are to be regarded as merely illustrative:

Figure 1 is a top plan view of the presently preferred embodiment of the invention;

Figure 2 is a longitudinal section on an enlarged scale taken as indicated by the line 2—2 of Figure 1;

Figure 6 is a simplified view in plan showing the configuration of the pump volute.

Figure 3:
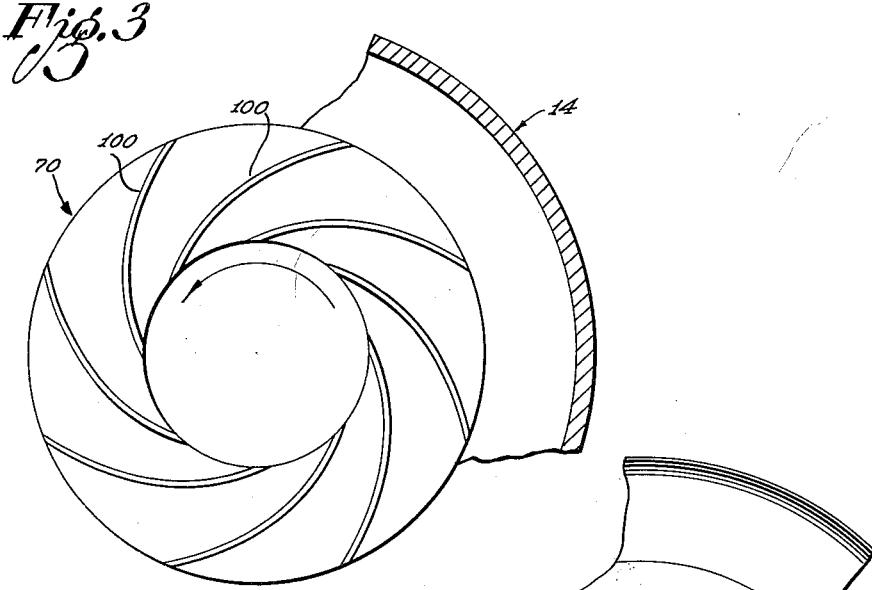
Figure 3 is a fragmentary transverse section taken as indicated by the line 3—3 of Figure 2 and showing the arrangement of the blades of the centrifugal impeller stage at the upper discharge end of the pump chamber.

In the drawings illustrating the presently preferred embodiment of the invention, Figure 1 indicates how the transfer pump may be mounted in a fuel tank having a top wall 10 and a bottom wall 12. The pump has a casing, generally designated by numeral 14, which extends downward through a circular opening 15 in the top tank wall 10 and which extends close to the bottom of the tank. The pump casing 14 has the usual mounting flange 16 which rests on the upper surface of the top wall 10, the mounting flange being provided with the usual screw holes 18 and sealing gasket 20.

The pump casing 14 has a passage for fuel flow therethrough, which passage comprises a pump chamber, generally designated 22, a volute 24 and a discharge conduit 25 connected tangentially to the volute. The configuration in plan of the volute 24 and the conduit 25 is shown in Figure 6.

The pump chamber 22 which is of annular or ring-shaped cross-sectional configuration is of minimum diameter at a region that is generally designated by numeral 26 in Figure 2. This region 26 may be termed the vapor collection zone since it is in this region that vapor and gas bubbles above a given size tend to collect in the normal operation of the pump. Below the vapor collection zone 26, the annular pump chamber 22 is flared outward to form a circumferential inlet 28 which may be termed a radial inflow inlet. This radial inflow inlet 28 is surrounded by a suitable annular screen 39. In the construction shown, the lower flared portion of the pump chamber adjacent the radial inflow inlet 28 is at an inclination such that the flow moves radially inward as it enters the passage. The upper end of the pump chamber 22 above the intermediate collection zone 26 is also flared outward in communication with the surrounding volute 24 and here again the flared portion of the pump chamber adjacent the volute is at an inclination more nearly horizontal than vertical.

The pump casing 14 may be made in a number of separate sections in a well known manner. In the construction shown, the casing 14 includes an upper support section 14a which forms an annular space 30, this space being vented to the tank by a number of large openings 31. The casing section 14a has an outer conically curved wall 32, an upper radial wall 33 and an inner conically curved wall 34. The lower end of the outer conically curved wall 32 is connected to an upwardly convergent conical wall 35 which is integral with an upwardly extending inner cylindrical wall 36.

Figure 4:
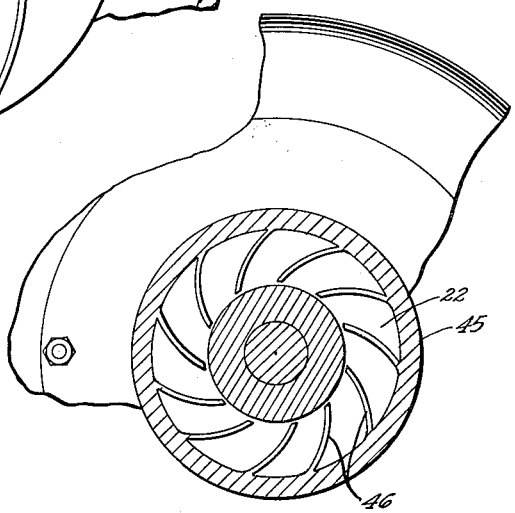
Figure 4 is a fragmentary transverse section taken as indicated by the line 4—4 of Figure 2 and showing the arrangement of a series of stator blades in the pump chamber to reduce the rate of rotation of the fluid in the region of the vapor collection zone.

The support section 14a of the casting 14 is connected to an adjacent lower casing section 14b by studs 42 and nuts 44 and this second casing sections forms the outer wall 45 of the pump chamber 22. This outer wall 45 has a series of inwardly directed stator blades 46 integral therewith, the configuration and arrangement of the stator blades being shown in Figure 4. The bottom circumferential edge of the casing section 14b is preferably provided with a hardened metal insert ring 48 which forms the upper rim of the radial inflow inlet 28.

Figure 5:
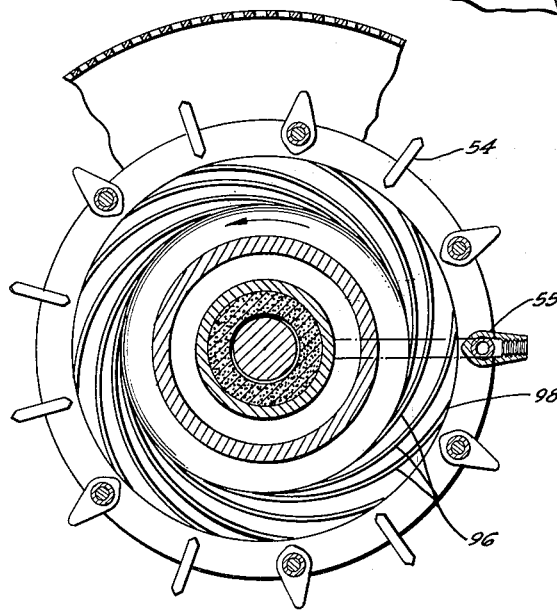
Figure 5 is a fragmentary transverse sectional view taken as indicated by the line 5—5 of Figure 2 and showing the arrangement of the inducer blades of the input stage of the rotary impeller at the radial inflow inlet of the pump.

The pump casing 14 is completed by a bottom section 14c which forms the bottom wall of the casing and which is connected to the casing section 14b by bolts 50 and nuts 52. Integral with the insert ring 48 is a circumferential series of stationary radial vanes which, as best shown in Figure 5, include relatively thin vanes 54 and thicker streamlined vanes 55. Most of the thicker stationary vanes 55 are bored to receive the previously mentioned bolts 50 and one of the thicker vanes, designated 55a in Figures 1 and 5, has an upright bore 56 therethrough which is part of a lubrication passage. This lubrication passage includes an upright bore 56 in the casing section 14b that communicates with the high pressure region at the volute 24. The lubrication passage further includes a horizontal bore 58 and an upwardly inclined bore 60 in the bottom casing section 14c, these two bores being closed at their outer ends by screw plugs 62. The bottom casing section 14c forms a cylindrical bearing seat 64 which has an inner circumferential lubrication groove 65 in communication with the described lubrication passage. A second upper lubrication passage 66 in the wall 35 of the upper casing section 14a extends from the volute 24 to an inner circumferential groove 68 of a second upper bearing seat formed by the inner cylindrical casing wall 36.

Journaled in the pump casing 14 is a rotary impeller assembly comprising a rotor, generally designated by numeral 70, mounted on an upright drive shaft 72. In the construction shown, the drive shaft 72 is formed with a radial enlargement or integral collar 74. The lower end of the shaft 72 is journaled in a carbon bearing 75 in the cylindrical bearing seat 64, which carbon bearing has radial bores 76 in communication with the surrounding lubrication groove 65. In like manner, the drive shaft 72 extends through an upper carbon bearing 78 on which the shaft collar 74 rests to support the weight of the impeller assembly. The carbon bearing 78 has radial bores 80 communicating with the surrounding lubrication groove 68 and additional lubrication bores 82 to convey lubricant to the underside of the shaft collar 74.

Abutting the upper side of the shaft collar 74 is a carbon sealing ring 84 supported by a gland 85. The gland 85 is mounted in the upper casing section 14a by cap screws 86 and is sealed by surrounding O-ring 88.

The rotor 70 forms the inner circumferential wall 90 of the pump chamber 22 and is keyed to the drive shaft 72 between the two snap rings 92. The rotor 70 may be made in two sections comprising an upper section 70a and a lower section 70b. The upper rotor section 70a is formed with a cylindrical flange 94 on its upper end for cooperation with a labyrinth sealing ring 95 mounted in the upper casing section 14a. The lower section 70b of the rotor provides the input or inducer stage of the impeller assembly, which stage comprises a circumferential series of inducer blades 96 positioned on the rotor between the outer stationary vanes 54, 55 and the inner stator blade 46. As shown in Figure 5, the inducer blades 96 are of helical curvature and are formed with sharpened outer leading edges 98 that point in the direction of rotation of the rotor.

The upper rotor section 70a provides the centrifugally impeller stage comprising a circumferential series of impeller blades 100. Preferably, the impeller blades 100 are swept back as shown in Figure 3.

The vapor collection zone 26 may be vented to the exterior of the pump casing in any suitable manner. In the construction shown, the venting arrangement includes radial bores 102 adjacent the collection zone 26 which extend inwardly through the rotor 70 and into the drive shaft 72 to communicate with an axial bore 104 in the drive shaft. The lower outer end of the axial bore 104 is closed by a screw plug 105 and the upper blind end of the axial bore communicates with radial bores 106 in the shaft collar 74. These bores 102, 104, 105 provide vent paths to the interior of the inner cylindrical wall 36 of the pump casing which has radial bores 108 for vent flow into the annular space 30 and out through the openings 31 into the ambient atmosphere in the upper region of the fuel tank.

The operation of the fuel transfer pump may be understood from the foregoing description. The inducer blades 96 slice into the surrounding liquid fuel to throw the fuel inwardly into the pump chamber 22. In this manner the inducer blades 96 serve both to raise the pressure of the fluid and to impart whirl to the fluid concentrically of the annular pump chamber 22. The outer stationary radial vanes 54 and 55 that surround the inducer blades 96 serve two purposes. One purpose is to remove whirl from the incoming flow which might occur from localized reversal of flow in the inducer stage. The other purpose is to block the tendency for liquid to be thrown off the inducer stage along tangential paths by centrifugal force. This tendency becomes evident when the fuel level drops close to the bottom of the fuel tank.

The row of stator blades 46 immediately downstream from the inducer blades 96 insures restraint in the rotation of the liquid in the region of the vapor collection zone 26. It is to be noted, however, that sufficient whirl remains to cause vapor bubbles larger than some given size to seek the vapor collection zone 26 by centripetal action. The given bubbles size may, for example, be a diameter of two-thirds of a millimeter.

As the whirling liquid moves upward from the inner stator blades 46 into the vapor collection zone 26, vapor bubbles larger than the given size are forced centripetally inward to the inner circumferential wall 90 of the pump chamber where the fuel vapor carried by the bubbles is vented into the radial bores 102. From the radial bores 102, the vapor passes up the axial bore 104 of the drive shaft 72 for release through the radial bores 106 in the shaft collar 74. The vapor released in this manner passes through the radial bores 108 and the larger openings 31 of the pump casing to reach the interior of the fuel tank.

The static pressure in the vapor collection zone 26 is relatively high because the rotation of the fluid is restrained and because the pump chamber 22 is enlarged in cross-sectional area in the region of the collection zone 26. The static pressure is substantially above atmospheric pressure even at shut off when the whirl produced by the inducer is greatest. Since the pressure in the collection zone 26 is higher than the tank pressure, a minor portion of the vapor may be condensed in the pump chamber and some of the vapor bubbles may shrink for this reason. All of the vapor bubbles above a given size, however, are driven centripetally inward into the collection zone 26.

The remaining smaller vapor bubbles are entrained in the liquid that is thrown radially outward by the blades 100 of the centrifugal impeller stage. Since the drag on the entrained bubbles by the outwardly flowing liquid is opposed by centripetal force, the discharge end of the pump chamber 22 immediately adjacent the volute 24 is narrowed, as may be seen in Figure 1, to increase the velocity of flow of the liquid thereby to increase the drag of the liquid on the entrained minute vapor bubbles.

A typical transfer fuel pump of the described construction may, for example, be made in accord with the following data:

Inducer:
  Diameter _____ 2.87 inches.
  Number of blades _____ 12
  Blade thickness _____ .012 inch.
  Blade solidity _____ 2.5
  Blade angle at inlet _____ 6.5° to tangential.
  Blade angle at exit _____ 10.0° to tangential.
  Flow coefficient _____ 0.10

Stator blades:
  Number of blades _____ 11
  Blade solidity _____ 1.5 (max.).
  Blade angle at the inlet
    ends of the blades _____ 32° to tangential.
  Blade angle at the exit ____ 45° to tangential.

Centrifugal impeller:
  Diameter _____ 3.51 inches.
  Number of vanes _____ 8
  Impeller angle _____ 22° to tangential.

Our description in specific detail of the presently preferred embodiment of the invention will suggest various changes, substitutions and other departures from our disclosure within the spirit and scope of the appended claims.

We claim:

1. In a vapor purging pump for volatile liquids, the combination of: a casing having a passage for flow of liquid therethrough, said passage having a radially inwardly directed intake portion, a radially inwardly located vapor collection zone downstream from said intake portion; a vent passage from said collection zone to the exterior of the casing for venting vapors from the collection zone; a rotary impeller assembly in said passage having an input stage in said intake portion upstream from said zone and a centrifugal impeller stage downstream from said zone, said input stage having a peripheral intake and having blades to draw the liquid into said passage radially thereof and to impart rotation to the liquid to cause travel of bubbles in the liquid above a given size to said collection zone by centripetal force, the remaining smaller bubbles being entrained by the liquid in said centrifugal impeller stage, said blades being at acute angles to tangential with the blades overlapping circumferentially of the impeller assembly and forming a circular series of helically curved inducer passages having their outer input ends pointing in the direction of rotation of the impeller assembly.

2. A combination as set forth in claim 1 which includes stator blades between said input stage and said collection zone to retard the rotation of the liquid to create a higher static pressure at said collection zone than the ambient pressure at the exterior of the pump whereby a pressure differential exists to cause vapor to flow from said collection zone through said vent passage to the pump exterior.

3. In a vapor purging pump for submersion in volatile liquids, the combination of: a casing having an upright annular passage for flow of liquid upward therethrough, said annular passage having intermediate portion of reduced inside diameter forming a radially inwardly located vapor collection zone, said annular passage having an inwardly convergent peripheral intake portion at the bottom of said casing and an outwardly divergent portion above said zone; a rotary impeller means in said passage having an input stage in said inwardly convergent portion of the passage and a centrifugal impeller stage in said outwardly divergent portion of the passage, said input stage having thin overlapping blades inclined at acute angles to tangential to impart rotation to the liquid to cause travel of vapor bubbles in the liquid to said collection zone by centripetal force, there being a passage from said collection zone for venting vapors therefrom to the exterior of the casing, said blades of the intake stage forming a circular series of helically curved inducer passages having their outer input ends pointing in the direction of rotation of the impeller assembly; and stator blades between said input stage and said collection zone to retard the rotation of the liquid to create a higher static pressure at said collection zone than the ambient pressure at the exterior of the pump whereby a pressure differential exists to cause vapor to flow from said collection zone through said vent passage to the pump exterior.

4. In a vapor purging pump for submersion in volatile liquids, the combination of: a casing having an upright annular passage for flow of liquid upward therethrough, said annular passage having intermediate portion of reduced inside diameter forming a radially inwardly located vapor collection zone, said annular passage having an inwardly convergent intake portion at the bottom of said casing and an outwardly divergent portion above said zones; a rotary impeller means in said passage having an input stage in said inwardly convergent portion of the passage and a centrifugal impeller stage in said outwardly divergent portion of the passage, said input stage having blades inclined to impart rotation to the liquid to cause travel of vapor bubbles in the liquid to said collection zone by centripetal force, there being a passage from said collection zone for venting vapors therefrom to the exterior of the casing, said blades of the intake stage forming a circular series of helically curved inducer passages having their outer input ends pointing in the direction of rotation of the impeller assembly; and a circular series of stationary vanes in said annular passage surrounding said blades of the input stage to keep the blades from throwing liquid centrifugally out of said inwardly convergent portion of the annular passage.

5. In a vapor purging pump for submersion in volatile liquids, the combination of: a casing having an upright annular passage for flow of liquid upward therethrough, said annular passage having intermediate portion of reduced inside diameter forming a radially inwardly located vapor collection zone, said annular passage having an inwardly convergent intake portion at the bottom of said casing and an outwardly divergent portion above said zones; a rotary impeller means in said passage having an input stage in said inwardly convergent portion of the passage and a centrifugal impeller stage in said outwardly divergent portion of the passage, said input stage having blades inclined to impart rotation to the liquid to cause travel of vapor bubbles in the liquid to said collection zone by centripetal force, there being a passage from said collection zone for venting vapors therefrom to the exterior of the casing, said blades of the intake stage forming a circular series of helically curved inducer passages having their outer input ends pointing in the direction of rotation of the impeller assembly; and a circumferential series of stator blades in said annular passage between said input stage and said collection zone to slow down the rotation of the liquid in said collection zone for the creation of static pressure in the collection zone higher than the ambient pressure outside the casing thereby to cause vapor to flow outward from said collection zone through said vent passage.

6. A combination as set forth in claim 5 in which said outwardly converging portion of the annular passage tapers in cross section in the direction of flow for restriction of the flowing liquid with consequent acceleration of the flowing liquid to entrain the vapor bubbles that travel beyond said collection zone in the direction of liquid flow.

7. In a vapor purging pump for volatile liquids, the combination of: a casing having an annular passage for flow of liquid therethrough, said annular passage having a portion of reduced inside diameter forming a radially inward vapor collection zone, said passage having an inwardly convergent portion on the upstream side of said zone and an outwardly divergent portion on the downstream side of said zone; a rotary impeller means in said passage having an input stage in said inwardly convergent portion of the passage and a centrifugal impeller stage in said outwardly divergent portion of the passage, said input stage having blades inclined to impart rotation to the liquid to cause travel of vapor bubbles in the liquid to said collection zone by centripetal force, there being a passage from said collection zone for venting vapors therefrom to the exterior of the casing, said input stage having inducer blades forming a circular series of helically curved inducer passages having their outer input ends pointing in the direction of rotation of the impeller assembly; a circular series of stationary vanes in said passage surrounding said series of inducer blades to keep the inducer blades from throwing liquid centrifugally out of said convergent portion of the passage; and a circumferential series of stator blades in said annular passage between said input stage and said collection zone to slow down the rotation of the liquid in said collection zone for the creation of static pressure in the collection zone higher than the ambient pressure outside the casing thereby to cause vapor to flow outward from said collection zone through said vent passage.

References Cited in the file of this patent

UNITED STATES PATENTS

| | | |
|---|---|---|
| 1,143,957 | Hansen | June 22, 1915 |
| 1,213,889 | Lawaczeck | Jan. 30, 1917 |
| 2,265,806 | Goldschmied | Dec. 9, 1941 |
| 2,369,440 | Curtis | Feb. 13, 1945 |
| 2,480,435 | Aspelin | Aug. 30, 1949 |
| 2,575,568 | Topanelian | Nov. 20, 1951 |
| 2,575,923 | McMahon et al. | Nov. 20, 1951 |
| 2,663,424 | Bynum | Dec. 22, 1953 |
| 2,734,457 | Fernstrum | Feb. 14, 1956 |
| 2,737,897 | Dewees | Mar. 13, 1956 |
| 2,923,246 | Wright | Feb. 2, 1960 |

FOREIGN PATENTS

| | | |
|---|---|---|
| 9,799 | Great Britain | Apr. 25, 1913 |
| 336,053 | Germany | June 28, 1919 |
| 604,448 | Great Britain | July 5, 1948 |
| 640,238 | France | Mar. 24, 1928 |
| 843,638 | France | Apr. 3, 1939 |